(12) United States Patent
Lee et al.

(10) Patent No.: US 7,492,808 B2
(45) Date of Patent: Feb. 17, 2009

(54) DECODING METHOD USING ADAPTIVE STEP-SIZE ALGORITHM FOR A SPACE-TIME CODED DS-CDMA SYSTEM

(75) Inventors: Jae Hong Lee, Seoul (KR); Joo Hyun Yi, Seoul (KR)

(73) Assignee: Seoul National University Industry Foundation, Seoul (KR)

( * ) Notice: Subject to any disclaimer, the term of this patent is extended or adjusted under 35 U.S.C. 154(b) by 622 days.

(21) Appl. No.: 11/114,508

(22) Filed: Apr. 26, 2005

(65) Prior Publication Data
US 2006/0078042 A1    Apr. 13, 2006

(30) Foreign Application Priority Data
Oct. 9, 2004    (KR) .................. 10-2004-0080708

(51) Int. Cl.
*H04B 1/00*    (2006.01)
(52) U.S. Cl. .............. 375/140; 375/134; 375/135; 375/136; 375/137; 375/140; 375/142; 375/143; 375/144; 375/148; 375/150; 375/295
(58) Field of Classification Search .......... 375/134, 375/135, 136, 137, 140, 142, 143, 144, 148, 375/150
See application file for complete search history.

(56) References Cited
U.S. PATENT DOCUMENTS
2004/0052306 A1 *    3/2004    Ibrahim et al. .............. 375/152

OTHER PUBLICATIONS

J. Yi et al.; "RAKE Receiver with Adaptive Interference Cancellers for a DS-CDMA System in Multipath Fading Channels," Proc. of the IEEE VTC2000-Fall, pp. 1216-1220, Boston, MA, Sep. 2000.
V. Krishnamurthy, et al.,"Adaptive Stepsize Algorithms for Blind Interference Suppression in DS/CDMA Systems," IEEE Trans. Signal Processing, vol. 49, No. 1, pp. 190-201, Jan. 2001.
V. Tarokh et al., "Space-time Codes for High Data Rate Wireless Communication: Performance Criterion and Code Construction," IEEE Trans. Inform. THeory, vol. 44, No. 2, pp. 744-765, Mar. 1998.
J. Yi et al., "Joint Interference Cancellation and ML Decoding Scheme for a Space-time Coded DS-CDMA System in a Mulitpath Fading Channel", Proc. of the IEEE Globecom 2002, pp. 1671-1675, Taipei, Taiwan, Nov. 2002.
J. Yi et al., Joint AIC and ML Decoder Scheme for a Space-Time Coded DS-CDMA System,: IEICE Trans. Commun., vol. E86-B, No. 8, pp. 2512-2516, Aug. 2003.
B. Widrow et al., "The Complex LMS Algorithm," Proc. IEEE, vol. 63, pp. 719-720, Apr. 1975.

* cited by examiner

*Primary Examiner*—Shuwang Liu
*Assistant Examiner*—Kabir A Timory
(74) *Attorney, Agent, or Firm*—Keusey, Tutunjian & Bitetto, P.C.

(57) ABSTRACT

Disclosed is a method for decoding received signals on communication channels between at least one transmit antenna and plural receive antennas in a space-time coded direct sequence (DS)-CDMA communication system. The decoding method includes steps of: adjusting the step-size which is an update unit for the tap weight vector for despreading received signals; updating the tap weight vector using the step-size; and despreading the received signals using the tap weight vector. According to the decoding method, the optimal performance can be achieved because the tap weight vector and the step-size are adaptively updated according to changes of communication environment. Such superior performance is more remarkable as the number of receive antennas and transmit antennas increases.

8 Claims, 4 Drawing Sheets

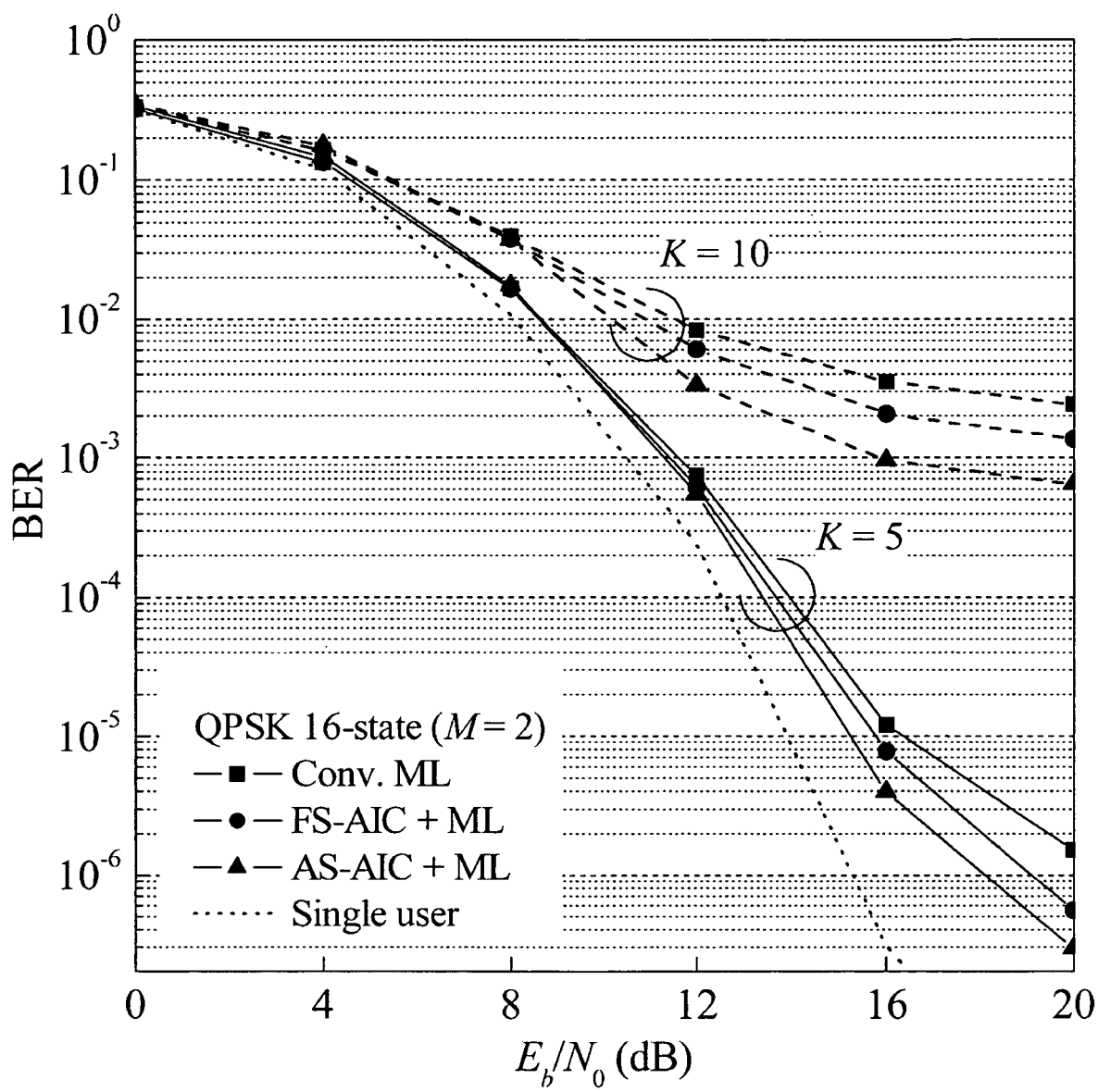

DECODING METHOD USING ADAPTIVE STEP-SIZE ALGORITHM FOR A SPACE-TIME CODED DS-CDMA SYSTEM

BACKGROUND OF THE INVENTION

1. Field of the Invention

The present invention relates to a method for decoding received signals on the communication channels between at least one transmit antenna and plural receive antennas in the space-time coded direct sequence (DS)-CDMA communication system. More specifically, the present invention relates to a decoding method comprising steps of: adjusting the step-size which is an update unit for the tap weight vector for despreading received signals; updating the tap weight vector by use of the step-size; and despreading the received signals by use of the tap weight vector.

2. Description of the Related Art

Generally, adaptive blind multiuser detection is useful in the direct sequence (DS)-code division multiple access (CDMA) system, as it can suppress multiple-access interference (MAI) and inter-symbol interference (ISI) without any knowledge beyond that required for the conventional single-user detector. The adaptive blind multiuser detection method is implemented as the linear minimum mean square error (MMSE) detector using the blind least mean square (LMS) algorithm, and the adaptive interference canceller (AIC) using the modified blind LMS algorithm, etc. Such a blind LMS algorithm has a problem that the performance heavily depends on the step-size.

The step-size is a parameter $\mu$ multiplied with the estimation value of the instantaneous gradient of the mean square error (MSE) $\nabla$ in the LMS algorithm ($x(i+1)=x(i)+\mu\cdot\nabla$). In the LMS algorithm, the variable x is adaptively updated, being proportional to the estimation value of the instantaneous gradient $\nabla$ and the step size $\mu$. As such, the step-size means an update unit for adaptively updating the variable x.

If the step size $\mu$ is too small, the speed of converging to an optimal value is too slow. If the step size $\mu$ is too large, the system may not converge and may diverge or be in an unstable state.

SUMMARY OF THE INVENTION

The present invention has been made to solve the above-mentioned problems occurring in the prior art. The invention relates to a method for decoding received signals using an adaptive step-size algorithm, wherein the step-size is adaptively updated, on the communication channels between at least one transmit antenna and plural receive antennas in the space-time coded direct sequence (DS)-CDMA communication system.

The method for decoding received signals according to the invention comprises steps of: adjusting the step-size which is an update unit for adaptive update of the tap weight vector for despreading received signals; updating the tap weight vector by use of the step-size; and despreading the received signals by use of the tap weight vector.

The decoding method according to the invention shows optimal performance since the tap weight vector and the step-size are adaptively updated according to changes of communication environment. Such superior performance is more remarkable as the number of receive antennas and transmit antennas increases.

Therefore, the invention provides a method for decoding received signals in the space-time coded DS-CDMA communication system.

More specifically, the invention relates to a method for decoding received signals in a space-time coded DS-CDMA communication system, comprising steps of:

(a) obtaining error value between (i) despread signal $\chi_m^P(\hat{X}_k(i))$ corresponding to $\hat{X}_k(i)$ determined as the received symbol in the i-th symbol time, and (ii) despread signal $\gamma_k^P(i)$ of received signal r(i) in the i-th symbol time for the k-th user of the p-th path at the m-th receive antenna;

(b) adjusting step size, which is an updating unit for the tap weight vector for despreading received signals, using the error value obtained in the step (a);

(c) updating the tap weight vector using the error value obtained in the step (a) and the step-size obtained in the step (b); and (d) despreading the received signal r(i+1) in the (i+1)th symbol time using the tap weight vector obtained in the step (c).

In the step (b), the step size $\mu$ is adjusted by the LMS (Least Mean Square) algorithm as in the following equation 1:

$$\mu(i+1)=\mu(i)+\alpha Re\{e(i)r^T(i)Y(i)\} \qquad \text{[Equation 1]}$$

wherein, $\alpha$ denotes the learning rate of the LMS algorithm, e(i) is the error value between $\chi_m^P(\hat{X}_k(i))$ and $\gamma_k^P(i)$, r(i) is the received signals in the i-th symbol time, T is a transpose operator, and Y(i) is a derivative $\partial w(i,\mu)/\partial \mu |_{\mu=\mu(i)}$ of the tap weight vector in the i-th symbol time.

The derivative Y is updated by the following equation 2:

$$Y(i+1)=\{I-\mu r^*(i)r^T(i)\}Y(i)+e(i)r^*(i) \qquad \text{[Equation 2]}$$

wherein,

I is an identity matrix, $\mu$ is the step-size,

* is a conjugate operator, and r(i), e(i) and T are defined as above equation 1.

In the step(c), the tap weight vector w is updated by the complex least mean square algorithm as in the following equation 3:

$$w(i+1)=w(i)+\mu e(i)r^*(i) \qquad \text{[Equation 3]}$$

wherein $\mu$, e(i), r(i) and * are defined as above.

As the space-time coded DS-CDMA communication system generally uses the signal constellation in the complex domain, it performs signal processing in the complex domain after despread. Therefore, the complex LMS algorithm extended to operate in the complex domain is used to update the tap weight vector w.

The error value e(i) between $\chi_m^P(\hat{X}_k(i))$ and $\gamma_k^P(i)$ means the Euclidean distance for the codeword $\hat{X}_k(i)$ which transits the state $\hat{S}_i$ to the state $\hat{S}_{i+1}$ in the symbol time for the k-th user in the p-th path. The error value e(i) is given as equation 4:

$$e(i)=\epsilon(\hat{S}_{i+1}|\hat{S}_i)=\chi_m^P(\hat{X}_k(i))-\gamma_k^P(i) \qquad \text{[Equation 4]}$$

wherein, $\epsilon(s_{i+1}|s_i)$ denotes the Euclidean distance for the codeword which transits the state $s_i$ to the state $s_{i+1}$, and the notation ⌢ means the selected value to minimize the path metric.

Therefore, the codeword $\hat{X}_k(i)$ which transits the state $\hat{S}_i$ to the state $\hat{S}_{i+1}$ is determined as the received symbol in the i-th symbol time. The Euclidean distance between the despread signal $\chi_m^P(\hat{X}_k(i))$ corresponding to $\hat{X}_k(i)$ and the despread signal $\gamma_k^P(i)$ of the i-th received signal r(i) is the error value e(i).

The Euclidean distance value stored in the ML (Maximum Likelihood) decoder is fed back from the ML decoder and used as the error value e(i). Thus, the decoding delay and the increment of complexity can be avoided.

BRIEF DESCRIPTION OF THE DRAWINGS

The above and other objects, features and advantages of the present invention will be more apparent from the following detailed description taken in conjunction with the accompanying drawings, in which:

FIG. 4 depicts bit error rates (BER) of a conventional maximum likelihood (ML) decoder, a fixed step-size adaptive interference canceller (FS-AIC), and the adaptive step-size/adaptive interference canceller according to the invention in case that the number of users is 1, 5 and 10 in the QPSK 16-state space-time trellis code.

DETAILED DESCRIPTION OF THE PREFERRED EMBODIMENTS

Hereinafter, the embodiments of the decoding method according to invention will be described in detail with reference to the accompanying drawings. However, the invention is not limited by these embodiments.

First, the space-time coded DS-CDMA system is explained.

Figure 1:
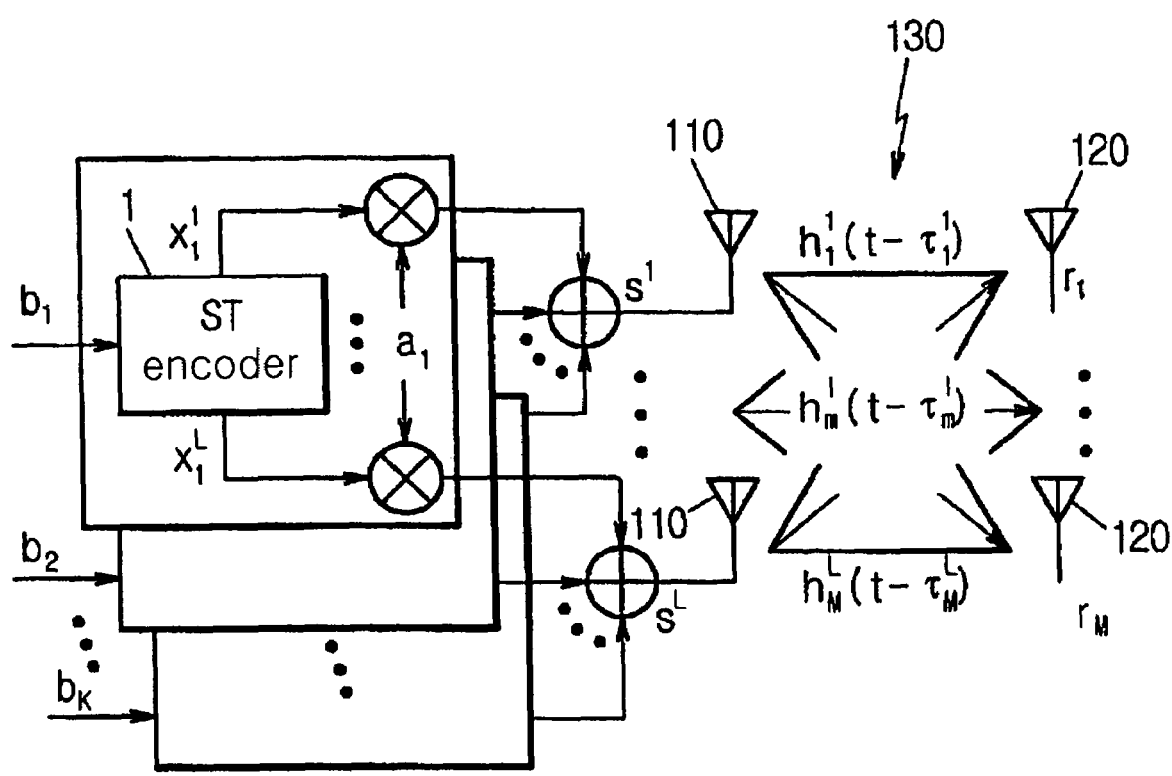
FIG. 1 depicts a space-time coded DS-CDMA system model.

FIG. 1 depicts a space-time coded DS-CDMA system model. It is assumed that, in the downlink of the DS-CDMA system having K users, the number of transmit antenna (110) of the base station is L, and the number of receive antenna (120) of the mobile station is M.

The i-th data bit of the k-th user, $b_k(i)$ (k=1, 2, ..., K) is space-time encoded using an encoder 1 (ST) to a codeword $x_k(i)=(x^1_k(i), ..., x^L_k(i))$ with length L. The encoded symbols of the k-th user are spread by being multiplied by the signature sequence $a_k=[a_{k,0}, a_{k,1}, ..., a_{k,N-1}]$ with length N. Then, they are mapped to each transmit antenna (110). It is assumed that the channels (130) between each pair of transmit antenna and receive antenna are i.i.d. Rayleigh fading channels with P paths of equal gains.

The baseband signal received at the m-th receive antenna is given by equation 5:

$$r_m(t) = \sqrt{E_s} \sum_{P=1}^{P} \sum_{l=1}^{L} h_m^{l,p}(t) \sum_{i=0}^{F-1} \sum_{k=1}^{K} x_k^l(i) \quad \text{[Equation 5]}$$

$$\sum_{n=0}^{N-1} a_{k,n} \cdot \varphi(t - iT_s - nT_c - \tau_m^p) + n_m(t)$$

wherein,

F is a frame length, $h_m^{l,p}(t)$ is a channel gain from the l-th transmit antenna to the m-th receive antenna through p-th path, $\varphi(t)$ is a rectangular chip pulse with a unit energy, $T_s$ is the symbol duration, $T_C$ is the chip duration, $T^p_m$ is a relative arrival time delay at the m-th receive antenna through the p-th path, $n_m(t)$ is a Gaussian noise with power density $N_0$, $a_{k,n}$ is a signature sequence, and $E_S$ is a symbol energy ($E_b/L$) wherein the bit energy ($E_b$) is divided by the number of transmit antennas (L).

N output signals from a chip matched-filter during each symbol duration make a received symbol vector $r^m_k(i)=[r^m_{k,0}(i), r^m_{k,1}(i), ..., r^m_{k,N-1}(i)]$ for the symbol duration. It is assumed that channel fading is slow enough not to be changed for the frame duration, and the arrival time delay $T^p_m$ is $T^p_m = d^p_m T_C$ for the integer $d^p_m \in [0, N-1]$ $\tilde{a}_k^d$ is a modified sequence of the signature sequence $a_k$. The n-th component of $\tilde{a}_k^d$ is defined by the following equation 6:

$$[\tilde{a}_k^d]_n = \begin{cases} a_{k,n-d} I_{n \geq d \geq 0}, & \text{for } 0 \leq d \leq N-1, \\ a_{k,n+d} I_{n-N < d < 0}, & \text{for } -N+1 \leq d < 0 \end{cases} \quad \text{[Equation 6]}$$

wherein, $I_A$, the indicator function for event A, is defined as follows:

$$I_A = \begin{cases} 1, & \text{if } A \text{ occurs} \\ 0, & \text{otherwise} \end{cases}$$

From the above definition, the signature sequence $a_k$ will be equal to $\tilde{a}_k^0$.

The received signal vector synchronized with the arrival time delay of the p-th path at the m-th receive antenna is given as following equation 7:

$$r_m^p(i) = \sqrt{E_s} \sum_{j=1}^{P} \sum_{l=1}^{L} h_m^{l,p}(i) \sum_{k=1}^{K} \left\{ x_k^l(i-1) \tilde{a}_k^{d^j_m - d^p_m - N} + \right. \quad \text{[Equation 7]}$$

$$\left. x_k^l(i) \tilde{a}_k^{d^j_m - d^p_m} + x_k^l(i+1) \tilde{a}_k^{N + d^j_m - d^p_m} \right\} + n_m^p(i)$$

wherein, $n^p_m(i)$ is a noise vector having N components which are independent zero-mean complex Gaussian random variables with the variance of $N_0/2$ for each of real part and imaginary part.

In the conventional single-user detector, the received signal vector is despread by the signature sequence. The despread signal for the k-th user of the p-th path at the i-th symbol time is given by the following equation 8:

$$y_k^p(i) = (a_k)^T r_m^p(i) \quad \text{[Equation 8]}$$

$$= \sqrt{E_s} \sum_{l=1}^{L} h_m^{l,p}(i) x_k^l(i) +$$

$$\sqrt{E_s} \sum_{\substack{j=1 \\ j \neq p}}^{P} \sum_{l=1}^{L} h_m^{l,p}(i) \sum_{u=1}^{K} \left\{ x_u^l(i) \gamma_{k,u}^{d^j_m - d^p_m} + \right.$$

$$\left. x_u^l(i-1) \gamma_{k,u}^{d^j_m - d^p_m - N} + x_u^l(i+1) \gamma_{k,u}^{N + d^j_m - d^p_m} \right\} + n_m^p(i)$$

$$= X_m^p(x_k(i)) + \eta_m^p(i)$$

wherein, $Y^d_{k,u}$ is a cross-correlation between $a_k$ and $\tilde{a}^d_u$, $$\chi^p_m(x_k(i)) = \sqrt{E_s} \sum_{l=1}^{L} h^{l,p}_m(i) x^l_k(i)$$

is the desired signal, and $\eta^p_m(i)$ is the interference-plus-noise signal which includes the remaining terms except the desired signal from the despread signal.

Hereinafter, the decoding method of the present invention, wherein the tap weight vector and the step-size are adapted to change of communication environment, will be explained.

In general, the received signal vector in the Adaptive Interference Canceller (AIC) is despread by the tap weight vector instead of the signature sequence. The output of the AIC for the k-th user of the p-th path at the i-th symbol time is given by the following equation 9:

$$\gamma^p_k(i) = \{w^p_k(i)\}^T r^p_m(i) \qquad \text{[Equation 9]}$$

wherein, $w^p_k(i)$ is the tap weight vector of the AIC. Based on MMSE criterion, the tap weight vector $w^p_k(i)$ is updated during every symbol ' period for minimizing MSE $E\{|e^p_k(i)|^2\} = E\{|\chi^p_m(\hat{X}_k(i)) - \gamma^p_k(i)|^2\}$ under the condition of $\{w^p_k(i)\}^T a_k = 1$.

For convenience, it is assumed that all operations are made for the k-th user of the p-th path at the m-th receive antenna to omit all the subscripts.

According to the invention, the tap weight vector is updated by the following equation 3a:

$$w(i+1) = w(i) - \mu\{\nabla_R(|e(i)|^2) + i\nabla_I(|e(i)|^2)\} \qquad \text{[Equation 3a]}$$
$$= w(i) + \mu e(i) r^*(i)$$

wherein, w(i+1) is a tap weight vector applied to the (i+1)-th symbol time, w(i) is a tap weight vector applied to the i-th symbol time, $\mu = 2\mu'$ is a step size, $\nabla_R(|e(i)|^2)$ and $\nabla_I(|e(i)|^2)$ are the gradients with respect to the real part and the imaginary part of the tap weight vector respectively, e(i) is an error value between $\chi^p_m(\hat{X}_k(i))$ and $\gamma^p_k(i)$, r(i) is the received signal of the i-th symbol time, and

* is a conjugate operator.

It is known that for the unknown optimum step-size $\mu_{opt} \in [\mu_{max}, \mu_{min}]$, there exists a unique stationary process $\{r(i), w(i,u)\}$.

Therefore, in the decoding method according to the invention, the adaptive step size $\mu$ is updated as following equation 1a by applying the LMS algorithm to adaptively minimize $E\{|e^p_k(i)|^2\} = E\{|\chi(\hat{x}(i)) - \{w(i,\mu)\}^T r(i)|^2\}$ with respect to $\mu$ under the condition of $\mu \in [\mu_{max}, \mu_{min}]$.

$$\mu(i+1) = \mu(i) - \alpha' \frac{\partial |e(i)|^2}{\partial \mu} \qquad \text{[Equation 1a]}$$
$$= \mu(i) + \alpha' \left[ e^*(i) \frac{\partial w^\dagger(i,\mu)}{\partial \mu} r^*(i) + e(i) \frac{\partial w^T(i,\mu)}{\partial \mu} r(i) \right]$$
$$= \mu(i) + \alpha \operatorname{Re}\{e(i) r^T(i) Y(i)\}$$

wherein, $\mu(i+1)$ is a step-size applied to the (i+1)-th symbol duration, $\mu$ is a step-size applied to the i-th symbol duration, $\alpha = 2\alpha'$ denotes the learning rate of the LMS algorithm, † denotes the conjugate transpose operator, T is the transpose operator, $Y(i)$ is a derivative $\partial w(i,\mu)/\partial \mu|_{\mu=\mu(i)}$ of the tap weight vector in the i-th symbol time, and

*, r(i) and e(i) are defined as above.

Y can be updated as equation 2a from taking the derivatives of equation 3a with respect to $\mu$:

$$Y(i+1) = Y(i) + e(i) r^*(i) + \mu \frac{\partial \{e(i) r^*(i)\}}{\partial \mu} \qquad \text{[Equation 2a]}$$
$$= \{I - \mu r^*(i) r^T(i)\} Y(i) + e(i) r^*(i)$$

wherein,

Y(i+1) is a derivative of the tap weight vector applied in the (i+1)-th symbol time, Y(i) is a derivative of the tap weight vector applied in the i-th symbol time, I is an identity matrix, and

*, $\mu$, r(i) and e(i) are defined as above.

The adaptive step-size algorithm extended to the complex domain can be applied to the space-time coded DS-CDMA system with complex signal constellation.

Let $\epsilon(s_{i+1}|s_i)$ denote the Euclidean distance between the desired signal and the despread signal for the k-th user of the p-th path. Then, the error signal in the decoding method of the present invention, wherein adaptive step-size/adaptive interference cancelling algorithm is applied, is given by the following equation 4:

$$e(i) \equiv \epsilon(\widehat{S}_{i+1}|\widehat{S}_i) = \chi^p_m(\hat{X}_k(i)) - \gamma^p_k(i) \qquad \text{[Equation 4]}$$

wherein, $\epsilon(s_{i+1}|s_i)$ means the Euclidean distance of the codeword corresponding to the state transition from the state $s_i$ to the state $s_{i+1}$, and notation ⌢ notation means the selected value to minimize the path metric.

Therefore, the Euclidean distance value fed back from the ML decoder in every symbol duration can be used as the error signal e(i). The decoding delay and the increment of complexity can be avoided.

From the equation 4, the above equations 1 to 3 can be modified as following equations 10 to 12, which are related to the update of step-size, derivative and tap weight vector in the decoding method of the present invention:

$$\mu(i+1) = \left[ \mu(i) + \alpha \operatorname{Re}\{\epsilon(\widehat{s}_{i+1}|\widehat{s}_i) r^T(i) Y(i)\} \right]^{\mu_{max}}_{\mu_{min}} \qquad \text{[Equation 10]}$$

$$Y(i+1) = \{I - \mu(i) r^*(i) r^T(i)\} Y(i) + \epsilon(\widehat{S}_{i+1}|\widehat{S}_i) r^*(i) \qquad \text{[Equation 11]}$$

$$w(i+1) = w(i) + \mu(i) \epsilon(\widehat{S}_{i+1}|\widehat{S}_i) r^*(i) \qquad \text{[Equation 12]}$$

wherein, the bracket [ ] with superscript $\mu_{max}$ and subscript $\mu_{min}$ denotes truncation for satisfying the condition of $\mu \in [\mu_{max}, \mu_{min}]$.

Figure 2:
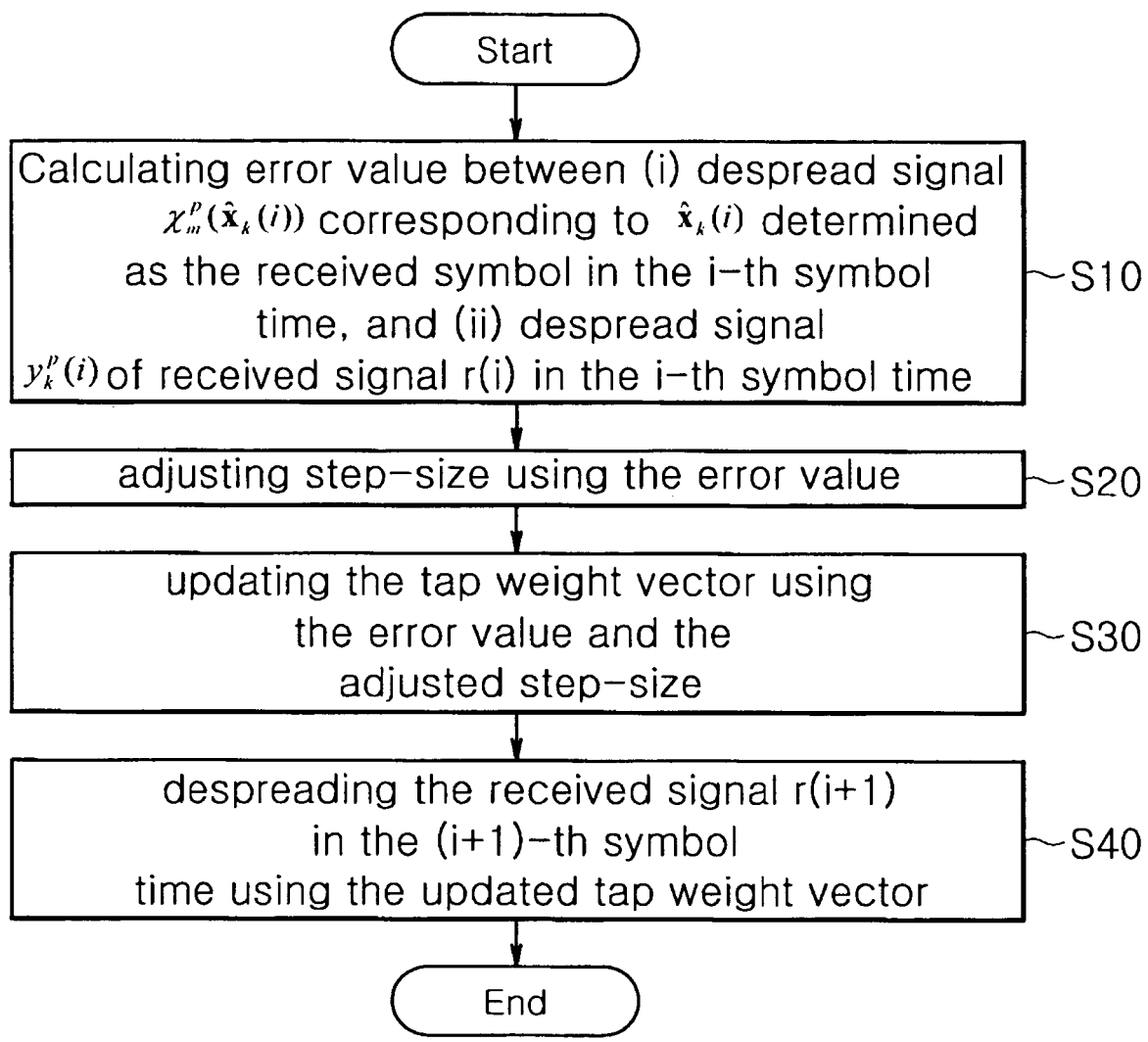
FIG. 2 is a flowchart of the method for decoding the received signal according to the invention.

FIG. 2 is a flowchart of the method for decoding the received signal according to the invention;

First, as mentioned above, the error value between (i) despread signal $\chi_m^P(\hat{X}_k(i))$ corresponding to $\hat{X}_k(i)$ determined as the received symbol in the previous symbol time (i.e., i-th symbol time), and (ii) despread signal $\gamma_k^P(i)$ of received signal r(i) in the i-th symbol time for the k-th user of the p-th path at the m-th receive antenna is obtained (S10).

Then, the step-size, which is an updating unit for the tap weight vector for despreading received signals, is adjusted (S20) using the error value obtained in the step (S10).

Then, the tap weight vector is updated (S30) using the error value obtained in the step (S10) and the step-size obtained in the step (S20).

Then, the received signal r(i+1) in the next symbol time (i.e., (i+1)th symbol time) is despread (S40) using the tap weight vector obtained in the step (S30). Through such processes, the tap weight vector and the step-size can be adaptively updated according to changes of communication environment, and the optimal performance can be achieved.

Hereinafter, the simulation results of the decoding method according to the invention will be explained.

The performance of the decoding method of the invention is evaluated in the downlink of the space-time coded DS-CDMA system with two transmit antennas to each of which equal transmit power is assigned. It is assumed that the receiver makes a perfect estimation on the channel gain and arrival time delay of each path. The signature sequence is randomly selected among the family of the Gold sequence of length N=31 for each user.

The frame has the information data of 260 bits including padding bits which are encoded by the Tarokh's QPSK space-time code with 8 and 16 states for L=2. It is assumed that normalized fading rate $f_D T_f$ is 0.001, wherein $f_D$ is the maximum Doppler frequency and $T_f$ is frame duration. Further, it is assumed that the relative arrival time delay $T^p_m$ is uniformly distributed in $[0, 10T_c]$.

The step-size for the fixed step-size/adaptive interference canceller is chosen as $\mu_{fix}$=0.005 among $\mu \in [5 \times 10^{-5}, 5 \times 10^{-1}]$ which is the value minimizing the averaged BER of the system at $E_b/N_0$=20 dB through several times of simulation for the given numbers of users and antennas. The initial value for the adaptive step-size adaptive interference canceller are set as $\mu(0)$=0.001 and Y(0)=0.1 $[1, \ldots, 1]^T$. Other settings are $\mu_{min}$=0, $\mu_{max}$=0.0025($E_b/N_0$) where $E_b/N_0$ is dB scale, and a $\alpha$=0.001.

Figure 3:
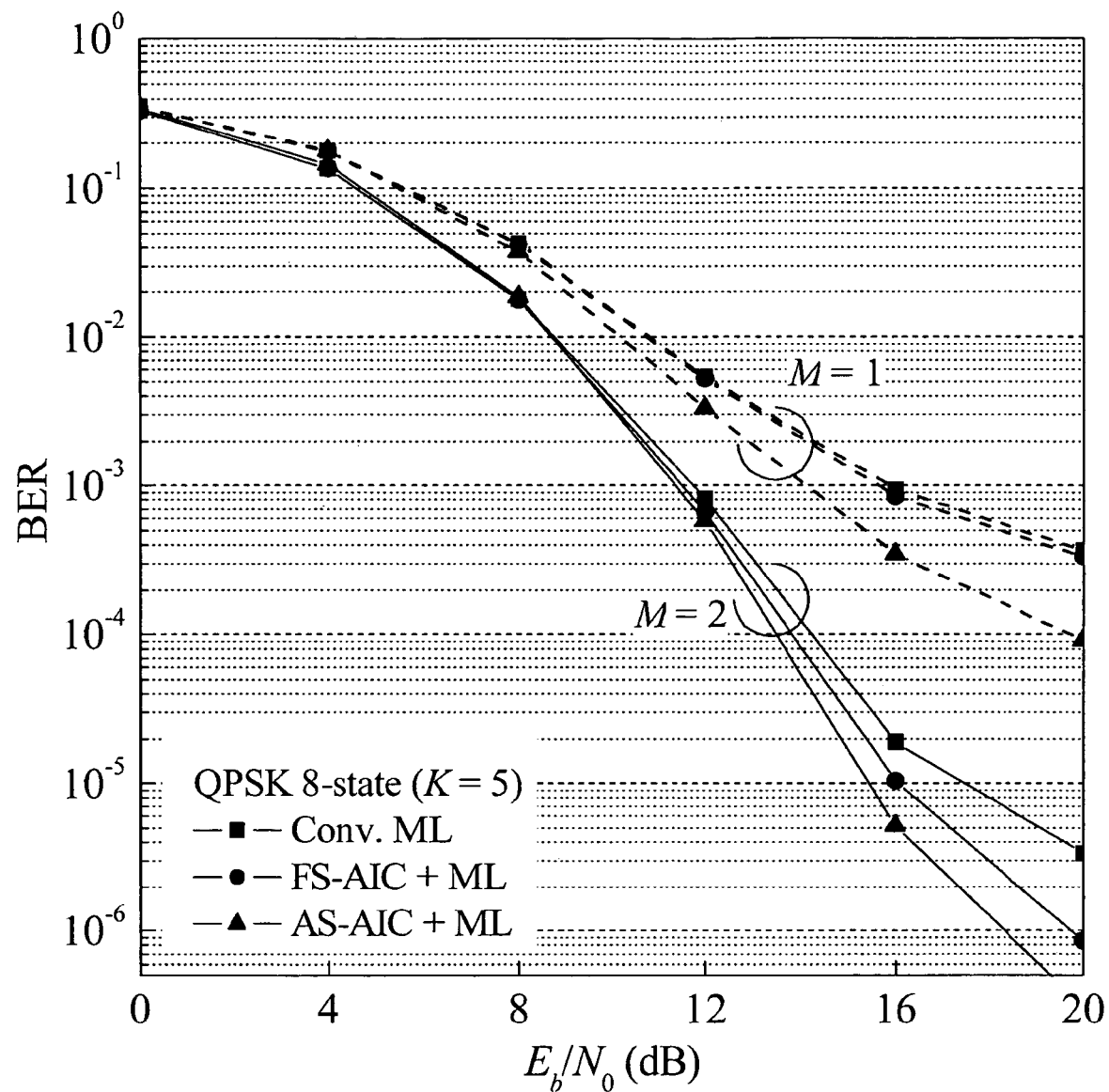
FIG. 3 depicts bit error rates (BER) of a conventional maximum likelihood (ML) decoder, a fixed step-size/adaptive interference canceller (FS-AIC), and the adaptive step-size/adaptive interference canceller according to the invention in case that the number of users is 5 in the QPSK 8-state space-time trellis code.

FIGS. 3 and 4 depict the performance of the space-time trellis coded DS-CDMA system for the conventional ML (Conv. ML), the fixed step-size/adaptive interference canceller (FS-AIC+ML), and the adaptive step-size/adaptive interference canceller (AS-AIC+ML) of the invention in a 2-path Rayleigh fading channel.

FIG. 3 depicts bit error rates (BER) of each decoding method in case that the number of users is 5 in the QPSK 8-state space-time trellis code. FIG. 4 depicts bit error rates (BER) of each decoding method in case that the number of users is 1, 5 and 10 in the QPSK 16-state space-time trellis code.

FIGS. 3 and 4 show that the adaptive step-size/adaptive interference canceller (AS-AIC+ML) according to the invention has the best performance. Especially, such superior performance is more remarkable as the number of receive antennas and transmit antennas increases.

As above mentioned, the decoding methods of the invention have the optimal performance because the tap weight vector and the step size are adaptively updated according to changes in communication environment.

Further, since the Euclidean distance fed back from the ML decoder is used as the error value e(i), the decoding delay and the increment of complexity can be avoided.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method for decoding received signals on communication channels between at least one transmit antenna and plural receive antennas in a space-time coded direct sequence (DS)-CDMA communication system, comprising steps of:

(a) obtaining an error value between (i) a despread signal $\chi_m^P(\hat{X}_k(i))$ corresponding to $\hat{X}_k(i)$ determined as a received symbol in an i-th symbol time, and (ii) a despread signal $\gamma_k^P(i)$ of a received signal r(i) in the i-th symbol time for a k-th user of a p-th path at a m-th receive antenna;

(b) adjusting a step-size, which is an updating unit for a tap weight vector for despreading the received signals, using the error value obtained in the step (a);

(c) updating the tap weight vector using the error value obtained in the step (a) and the step-size obtained in the step (b); and (d) despreading a received signal r(i+1) in an (i+1)-th symbol time using the tap weight vector obtained in the step (c), wherein, p=$\{1, 2, 3, \ldots, P\}$, P is the number of paths on the communication channels, m=$\{1, 2, 3, \ldots, M\}$, M is the number of receive antennas of DS-CDMA communication system, k=$\{1, 2, 3, \ldots, K\}$, K is the number of users of DS-CDMA communication system; and i=$\{1, 2, 3, \ldots, F\}$, F is a frame length of DS-CDMA communication system, wherein a step size $\mu(i+1)$ applied to the (i+1)th symbol time is given by the following equation:

$$\mu(i+1)=\mu(i)+\alpha Re\{e(i)r^*(i)Y(i)\} \quad \text{[Equation 1]}$$

wherein, $\alpha$ denotes a learning rate of a LMS (Least Mean Square) algorithm, e(i) is the error value between $\chi_m^P(\hat{X}_k(i))$ and $\gamma_k^P(i)$, r(i) is the received signals of the i-the symbol time, T is a transpose operator, and Y(i) is a derivative $\partial w(i,\mu)/\partial \mu|_{\mu=\mu(i)}$ of the tap weight vector in the i-th symbol time.

2. The method according to claim 1, wherein, in the step (b), the step-size is adjusted by the LMS (Least Mean Square) algorithm.

3. The method according to claim 1, wherein a derivative Y(i+1) applied to the (i+1)th symbol time is given as following equation:

$$Y(i+1)=\{I-\mu r^*(i)r^T(i)\}Y(i)+e(i)r^*(i) \quad \text{[Equation 2]}$$

wherein,

I is an identity matrix, $\mu$ is the step-size, r(i) is the received signals of the i-th symbol time, e(i) is the error value between $\chi_m^P(\hat{X}_k(i))$ and $\gamma_k^P(i)$,

* is a conjugate operator, and

T is a transpose operator.

4. The method according to claim 3, wherein, in the step(c), the tap weight vector is updated by a complex LMS (least mean square) algorithm.

5. The method according to claim 4, wherein a tap weight vector w(i+1) applied to the (i+1) symbol time is updated by the following equation:

$$w(i+1) = w(i) + \mu e(i) r^*(i) \quad \text{[Equation 3]}$$

wherein $\mu$ is the step-size, e(i) is the error value between $\chi_m^P(\hat{X}_k(i))$ and $\gamma_k^P(i)$, r(i) is the received signals of the i-th symbol time, and

* is a conjugate operator.

6. The method according to claim 2, wherein the error value e(i) between $\chi_m^P(\hat{X}_k(i))$ and $\gamma_k^P(i)$ i) is an Euclidean distance for a codeword $\hat{X}_k(i)$ corresponding to a state transition from a state $\widehat{S}_i$ to a state $\widehat{S}_{i+1}$ in a symbol time for the k-th user in the p-th path, the Euclidean distance being stored in a ML (most likelihood) decoder, and the error value e(i) is given by following equation:

$$e(i) \equiv \epsilon(\widehat{S}_{i+1}|\widehat{S}_i) = \chi_m^P(\hat{X}_k(i)) - \gamma_k^P(i) \quad \text{[Equation 4]}$$

wherein, $\epsilon(s_{i+1}|s_i)$ denotes the Euclidean distance for the codeword corresponding to the state transition from the state $s_i$ to the state $s_{i+1}$, and the notation $\frown$ means the selected value to minimize a path metric.

7. The method according to claim 3, wherein the error value e(i) between $\chi_m^P(\hat{X}_k(i))$ and $\gamma_k^P(i)$ is the Euclidean distance for a codeword $\hat{X}_k(i)$ corresponding to a state transition from a state $\widehat{S}_i$ to a state $\widehat{S}_{i+1}$ in the symbol time for the k-th user in the p-th path, the Euclidean distance being stored in a ML (most likelihood) decoder, and the error value e(i) is given by following equation:

$$e(i) \equiv \epsilon(\widehat{S}_{i+1}|\widehat{S}_i) = \chi_m^P(\hat{X}_k(i)) - \gamma_k^P(i) \quad \text{[Equation 4]}$$

wherein, $\epsilon(s_{i+1}|s_i)$ denotes the Euclidean distance for the codeword corresponding to the state transition from the state $s_i$ to the state $s_{i+1}$, and the notation $\frown$ means the selected value to minimize a path metric.

8. The method according to claim 5, wherein the error value e(i) between $\chi_m^P(\hat{X}_k(i))$ and $\gamma_k^P(i)$ is the Euclidean distance for a codeword $\hat{X}_k(i)$ corresponding to a state transition from a state $\widehat{S}_i$ to a state $\widehat{S}_{i+1}$ in the symbol time for the k-th user in the p-th path, the Euclidean distance being stored in a ML (most likelihood) decoder, and the error value e(i) is given as equation:

$$e(i) \equiv \epsilon(\widehat{S}_{i+1}|\widehat{S}_i) = \chi_m^P(\hat{X}_k(i)) - \gamma_k^P(i) \quad \text{[Equation 4]}$$

wherein, $\epsilon(s_{i+1}|s_i)$ denotes the Euclidean distance for the codeword corresponding to the state transition from the state $s_i$ to the state $s_{i+1}$, and the notation $\frown$ means the selected value to minimize a path metric.

* * * * *